United States Patent
Doxey et al.

(10) Patent No.: US 7,250,111 B2
(45) Date of Patent: Jul. 31, 2007

(54) POTABLE WATER DELIVERY SYSTEM WITH DISINFECTION AND RESIDUAL DISCHARGE UNIT AND METHOD

(75) Inventors: Joseph P. Doxey, Boca Raton, FL (US); Dennis Bordeaux, Boynton Beach, FL (US); Mark E. Jones, Littleton, CO (US)

(73) Assignee: Pure H20 Bio-Technologies, Inc., Boca Raton, FL (US)

( * ) Notice: Subject to any disclaimer, the term of this patent is extended or adjusted under 35 U.S.C. 154(b) by 375 days.

(21) Appl. No.: 10/972,988

(22) Filed: Oct. 25, 2004

(65) Prior Publication Data

US 2005/0109704 A1    May 26, 2005

Related U.S. Application Data

(60) Provisional application No. 60/519,940, filed on Nov. 14, 2003.

(51) Int. Cl.
*C02F 1/76* (2006.01)
(52) U.S. Cl. .................. 210/739; 210/753; 210/764; 210/97; 210/202; 210/206; 210/418
(58) Field of Classification Search .............. 210/97, 210/201, 202, 206, 418, 739, 753, 764; 422/37
See application file for complete search history.

(56) References Cited

U.S. PATENT DOCUMENTS

| 4,555,347 A | * | 11/1985 | O'Dowd et al. ............ 210/752 |
| 5,792,371 A | * | 8/1998 | Harvey et al. ............ 210/753 |
| 5,919,374 A | * | 7/1999 | Harvey et al. ............ 210/753 |

OTHER PUBLICATIONS

Disinfection, Sterilization, and Preservation, 2nd Edition, Edited by Seymour S. Block (pp. 208-213), Lea & Febiger, 1977, Philadelphia.

* cited by examiner

*Primary Examiner*—Matthew O. Savage
(74) *Attorney, Agent, or Firm*—Robert C. Kain, Jr.; Fleit Kain

(57) ABSTRACT

A water disinfection delivery treatment system first filters the supply by a particle and then a carbon filter. The partially treated flow is split in two and a first part passes through a first cutoff valve and is fed into a disinfection (iodine) chamber, filter or feeder via a flow restricter. The chamber output passes through a second solenoid driven cutoff valve. The second part is fed to a third cutoff valve and this valve's output is summed with the second valve's output and then fed into a holding tank. The tank retain's a volume such that the water remains therein for at least a period sufficient to permit a minimum 3 log reduction of pathogenic microbes. A final carbon filter is downstream of the tank as is a meter and dispenser. A method is also provided for delivering potable drinking water.

15 Claims, 2 Drawing Sheets

POTABLE WATER DELIVERY SYSTEM WITH DISINFECTION AND RESIDUAL DISCHARGE UNIT AND METHOD

The application is based upon and claims the benefit of provisional patent application Ser. No. 60/519,940, filed Nov. 14, 2003, now pending.

The present invention relates to a halogen-disinfectant water treatment system (preferably using iodine) and a method of generating potable drinking water.

BACKGROUND OF THE INVENTION

The use of halogens, including iodine, to purify water is known to clean or disinfect water. However, problems exist regarding purification levels, particulate matter and the amount of time the disinfectant must interact with the water to purify a volume of water. Iodine has long been recognized as an effective disinfectant for waterborne bacteria. It is equal to or better than chlorine for reduction of pathogenic species that are known to contaminate potable water sources. Chang and Morris (1952, cited in Block, 1977) showed that waterborne microbial contamination was reduced by 7 logs or greater when using 3-4ppm for 12 min at 24° C. (this is a CT value of about 48).

OBJECTS OF THE INVENTION

It is an object of the present invention to provide a potable drinking water disinfectant treatment system and method.

It is a further object of the present invention to provide a potable water disinfectant treatment system and method wherein a portion of the water flowing through the system is diverted through disinfectant crystals or solution, thereafter, a large volume of the treated water is retained in a holding tank for a predetermined period of time before the liquid is dispensed.

It is an additional object of the present invention to provide a disinfectant water treatment system and method wherein the disinfectant is fluidly isolated thereby preserving the disinfectant's integrity and concentration in the isolated liquid.

SUMMARY OF THE INVENTION

The disinfectant water treatment system is coupled to a pressurized water supply. The water supply is first filtered by a particle and then a granule activated carbon filter. The partially treated water flow is then split into two fluid pathways and a first part passes through a first cutoff valve and is fed into a disinfectant feeder (preferably an iodine filter) via an orifice plate that severely restricts flow through the disinfectant filter path. The iodine filter is sometimes called a feeder because the unit "feeds" or provides iodine to the hydraulic flow. The output of the filter passes through a second solenoid driven cutoff valve. The second portion of water supply is fed to a third cutoff valve and the output of the third cutoff valve plus the second cutoff valve is summed or joined together and then fed into a holding tank. The holding tank is large enough to retain a volume of water such that the water remains in the holding tank for at least five minutes prior to being dispensed from the treatment system. Downstream of the water tank is a final carbon filter, a meter and then a user controlled dispensing unit with a valve. A method is also provided for.

This is a water treatment method that controls the release of disinfectant solution and its delivery. The treatment system is a pressurized system that contains a particle filtration system, a flow through chamber, a disinfectant chamber, mixing chamber, contact chamber and carbon filtration system.

Untreated water enters the treatment system by passing through a 0.1-0.5 micron particle filter. A portion of the water is then routed into a mixing chamber where this water comes in contact with the disinfectant. The dissolved disinfectant water solution is then mixed with the main flow stream untreated water through a restricted opening of a calibrated size. The mixing of the dissolved disinfectant water solution and the untreated water occurs in the mixing chamber. The final disinfectant concentration level is maintained at a suitable level (10 and 20 parts per million or ppm) to ensure removal of the biological contaminates, i.e., protozoans, bacteria, viruses, fungi, and other etiological agents, to the appropriate regulated safety level. Embodiments of the system have the capacity to make adjustment in the concentration levels, contact time, and rate of flow of water. The treatment method employs an activated-carbon filtration before the final discharge. This filtration method removes any residual disinfectant as well as other halogens, metals, and organic compounds from the treated water. In other embodiments, the water treatment method involves temperature adjustment of the disinfection solution and contact chamber which can be modulated by heat to ensure desired disinfection solubility is maintained.

By combining an absolute pore diameter filtration media, absorption of undesirable inorganic and organic contaminants, and removal of disease causing organisms through the use of controlled disinfectant treatment can be adjustable for each water source. The system can also be configured in another embodiment to be used in conjunction with ozone for additional water treatment technology for the control and removal of drinking water contaminants through the use of multiple oxidizing agents which are combined with micron-size activated carbon filter media.

BRIEF DESCRIPTION OF THE DRAWINGS

Further objects and advantages of the present invention can be found in the detailed description of the preferred embodiments when taken in conjunction with the accompanying drawings in which.

DETAILED DESCRIPTION OF THE PREFERRED EMBODIMENTS

Figure 1:
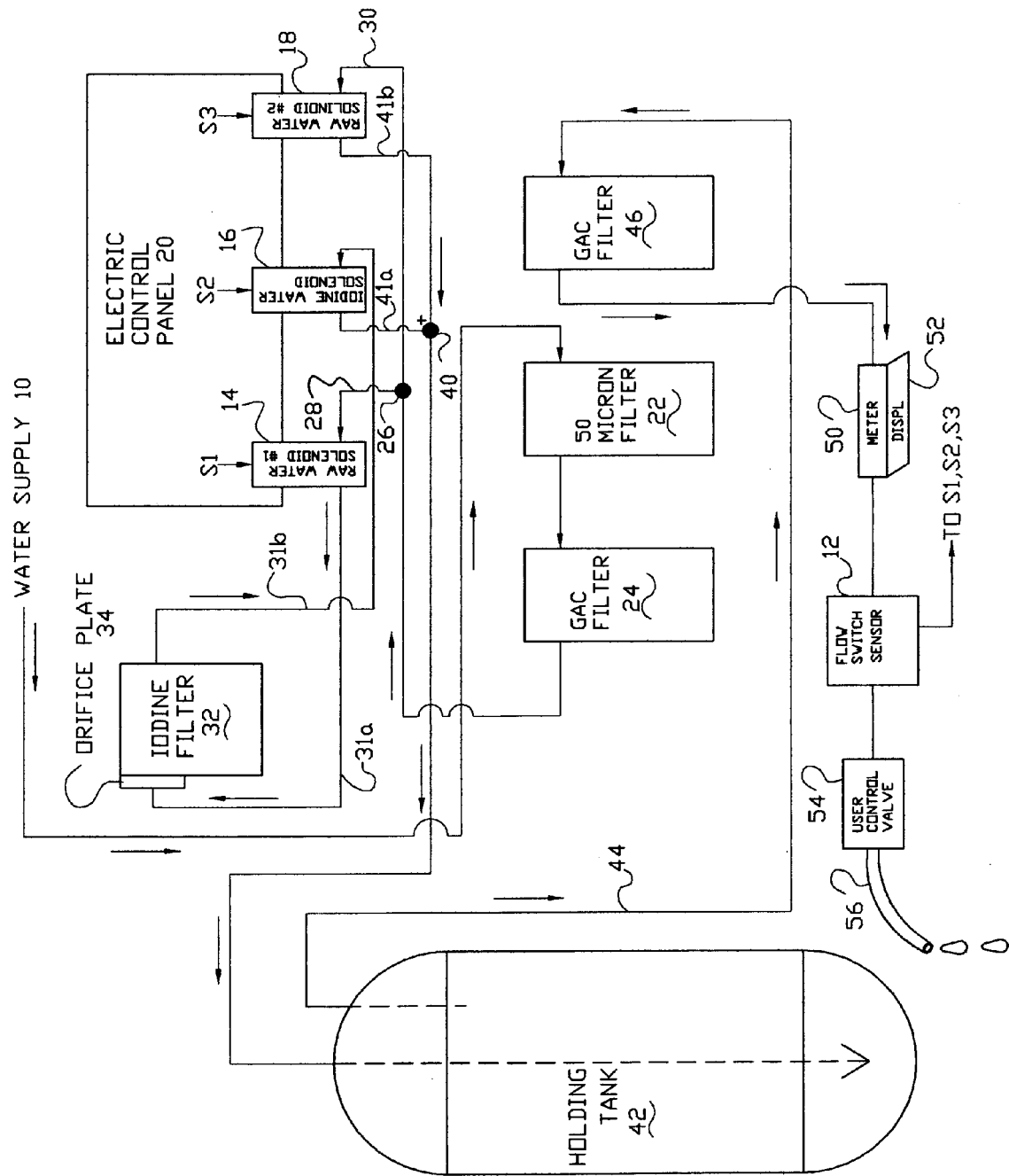
FIG. 1 diagrammatically illustrates the water disinfection treatment system and method and hydraulic flow through the system (some electrical controls are also shown)

The present invention relates to a water-disinfection treatment system and a method.

A recent study of one embodiment of the system using iodine as the halogen disinfection treatment showed inactivations by iodine at a CT value of 25 resulted in log 10 reductions ranging from 5.7 to 6.2 for three commonly present waterborne contaminants, i.e., *Escherichia coli, Pseudomonas aeruginosa* and, *Enterococcus faecalis,* respectively. At CT values of 50, the Log 10 reductions were greater than 8.0. CT is a common measurement unit referring to concentration in parts per million multiplied by time (in minutes). CFU is known as colony forming units per milliliter. These results are consistent with those found by Chang and Morris discussed above and, therefore, confirm that iodine is a very effective disinfectant for waterborne pathogenic bacteria. See references: Block, S. S., 1977. Disinfection, Sterilization and Preservation. Lea & Febiger, Philadelphia. $2^{nd}$ edition. The results of this test are presented in the tables that follow:

Iodine Disinfection of Bacteria

TABLE 1

Iodine Disinfection Test Conditions

| Test | Initial Iodine residual (mg/L) | Time (min) | Temperature |
|---|---|---|---|
| 1 | 5 | 5 | Ambient (~23° C.) |
| 2 |  | 10 |  |
| 3 |  | 15 |  |
| 4 | 15 | 5 |  |
| Process Control | 0 | 5 |  |

TABLE 2

Iodine Disinfection of E. coli
Experimental Results
Test date: Sep. 29, 2004

| E coli | Volume analyzed (mL)/Dilution | Raw counts | cfu/mL |
|---|---|---|---|
| Untreated Control Rep. 1 | 0.1/-4 | 97 |  |
| Untreated Control Rep. 2 |  | 93 |  |
| Untreated Control Rep. 3 |  | 87 |  |
| Untreated Control Average |  | 92 | $9.2 \times 10^6$ |
| Average $Log_{10}$/mL |  |  | 7.0 |
| Condition: 5 mg/L 5 min |  |  |  |
| Treated Rep. 1 | undiluted/10 | 171 |  |
| Treated Rep. 2 |  | 168 |  |
| Treated Rep. 3 |  | 185 |  |
| Average |  | 175 | $1.7 \times 10^1$ |
| $Log_{10}$/mL |  |  | 1.2 |
| Log10 removal |  |  | 5.7 |
| Condition: 5 mg/L 10 min |  |  |  |
| Treated Rep. 1 |  | 0 |  |
| Treated Rep. 2 | undiluted/10 | 0 |  |
| Treated Rep. 3 |  | 0 |  |
| Average |  | 0 |  |
| $Log_{10}$/mL |  |  | <0.1 |
| Log10 removal |  |  | <-1.0 |
| Condition: 5 mg/L 15 min |  |  | >8.0 |
| Treated Rep. 1 |  | 0 |  |
| Treated Rep. 2 | undiluted/10 | 0 |  |
| Treated Rep. 3 |  | 0 |  |
| Average |  | 0 |  |
| $Log_{10}$/mL |  |  | <0.1 |
| Log10 removal |  |  | <-1.0 |

TABLE 2-continued

Iodine Disinfection of E. coli
Experimental Results
Test date: Sep. 29, 2004

| E coli | Volume analyzed (mL)/Dilution | Raw counts | cfu/mL |
|---|---|---|---|
| Condition: 15 mg/L 5 min |  |  | >8.0 |
| Treated Rep. 1 |  |  |  |
| Treated Rep. 2 | undiluted/10 | 0 |  |
| Treated Rep. 3 |  | 0 |  |
| Outlet Rep. 3 |  | 0 |  |
| Average |  | 0 | <0.1 |
| $Log_{10}$/mL |  |  | <-1.0 |
| Log10 removal |  |  | >8.0 |
| Negative plate count |  | 0 |  |

TABLE 3

Iodine Disinfection of E. faecalis
Experimental Results
Test date: Sep. 29, 2004

| E faecalis | Volume analyzed (mL)/Dilution | Raw counts | cfu/mL |
|---|---|---|---|
| Untreated Control Rep. 1 | 0.1/-4 | 72 |  |
| Untreated Control Rep. 2 |  | 64 |  |
| Untreated Control Rep. 3 |  | 73 |  |
| Untreated Control Average |  | 70 | $7.0 \times 10^6$ |
| Average $Log_{10}$/mL |  |  | 6.8 |
| Condition: 5 mg/L 5 min |  |  |  |
| Treated Rep. 1 | undiluted/10 | 49 |  |
| Treated Rep. 2 |  | 38 |  |
| Treated Rep. 3 |  | 31 |  |
| Average |  | 39 | $3.9 \times 10^0$ |
| $Log_{10}$/mL |  |  | 0.6 |
| Log10 removal |  |  | 6.2 |
| Condition: 5 mg/L 10 min |  |  |  |
| Treated Rep. 1 | undiluted/10 | 0 |  |
| Treated Rep. 2 |  | 0 |  |
| Treated Rep. 3 |  | 0 |  |
| Average |  | 0 | <0.1 |
| $Log_{10}$/mL |  |  | <-1.0 |
| Log10 removal |  |  | >7.8 |
| Condition: 5 mg/L 15 min |  |  |  |
| Treated Rep. 1 |  | 0 |  |
| Treated Rep. 2 |  | 0 |  |
| Treated Rep. 3 |  | 0 |  |
| Average |  | 0 | <0.1 |
| $Log_{10}$/mL |  |  | <-1.0 |
| Log10 removal |  |  | >7.8 |
| Condition: 15 mg/L 5 min |  |  |  |
| Treated Rep. 1 | undiluted/10 | 0 |  |
| Treated Rep. 2 |  | 0 |  |
| Treated Rep. 3 |  | 0 |  |
| Average |  | 0 | <0.1 |
| $Log_{10}$/mL |  |  | <-1.0 |
| Log10 removal |  |  | >7.8 |

TABLE 3-continued

Iodine Disinfection of E. faecalis
Experimental Results
Test date: Sep. 29, 2004

| E faecalis | Volume analyzed (mL)/Dilution | Raw counts | cfu/mL |
|---|---|---|---|
| Negative plate count | | 0 | |

TABLE 4

Iodine Disinfection of P. aeruginosa
Experimental Results
Test date: Sep. 29, 2004

| P. aeruginosa | Volume analyzed (mL)/Dilution | Raw counts | cfu/mL |
|---|---|---|---|
| Untreated Control Rep. 1 | 0.1/−4 | 67 | |
| Untreated Control Rep. 2 | | 79 | |
| Untreated Control Rep. 3 | | 69 | |
| Untreated Control Average | | 71 | $7.1 \times 10^6$ |
| Average $\log_{10}$/mL | | | 6.9 |
| Condition: 5 mg/L 5 min | | | |
| Treated Rep. 1 | undiluted/10 | 171 | |
| Treated Rep. 2 | | 168 | |
| Treated Rep. 3 | | 185 | |
| Average | | 175 | $1.7 \times 10^1$ |
| $\log_{10}$/mL | | | 1.2 |
| $\log_{10}$ removal | | | 5.7 |
| Condition: 5 mg/L 10 min | | | |
| Treated Rep. 1 | undiluted/10 | 0 | |
| Treated Rep. 2 | | 0 | |
| Treated Rep. 3 | | 0 | |
| Average | | 0 | <0.1 |
| $\log_{10}$/mL | | | <−1.0 |
| $\log_{10}$ removal | | | >7.9 |
| Condition: 5 mg/L 15 min | | | |
| Treated Rep. 1 | undiluted/10 | 0 | |
| Treated Rep. 2 | | 0 | |
| Treated Rep. 3 | | 0 | |
| Average | | 0 | <0.1 |
| $\log_{10}$/mL | | | <−1.0 |
| $\log_{10}$ removal | | | >7.9 |
| Condition: 15 mg/L 5 min | | | |
| Treated Rep. 1 | undiluted/10 | 0 | |
| Treated Rep. 2 | | 0 | |
| Treated Rep. 3 | | 0 | |
| Average | | 0 | <0.1 |
| $\log_{10}$/mL | | | <−1.0 |
| Log10 removal | | | >7.9 |
| Negative plate count | | 0 | |

Since iodine residuals in drinking water at the disinfection ranges shown above are not acceptable by federal regulatory standards, it is necessary that detectable residuals be removed at the point of discharge. The data (Ion Specific Electrode method i.e., ISE), which follows, shows that this result is achieved by the process described in this patent application.

TABLE 5

Iodine Concentration (ISE Measured in subject treatment system A)

| Water Sample (90 ml) | Iodine Feeder Unit Sample | Discharge Unit Sample |
|---|---|---|
| No. 1 | 16.7 ppm | 0.0 ppm |
| No. 2 | 19.8 ppm | 0.0 ppm |
| No. 3 | 18.1 ppm | 0.0 ppm |
| Average | 18.2 ppm | 0.0 ppm |

TABLE 6

Iodine Concentration (ISE Measured in subject treatment system B)

| Water Sample (90 ml) | Iodine Feeder Unit Sample | Discharge Unit Sample |
|---|---|---|
| No. 1 | 15.7 ppm | 0.0 ppm |
| No. 2 | 16.9 ppm | 0.0 ppm |
| No. 3 | 14.1 ppm | 0.0 ppm |
| Average | 15.6 ppm | 0.0 ppm |

In the test listed in Tables 5 and 6, water samples were taken from the subject treatment systems A and B iodine feeder before the carbon filter units of each system and at the point of discharge. Table 5 represents operation of subject treatment system A after 6 months of sustained use and Table 6 represents operation of subject system B after 3 years of sustained use. These studies of the drinking water disinfection treatment and residual removal system suggest that the design subject to this patent application is capable of treating microbial contamination of water at levels equal to or greater than that evaluated in the microbiology lab study. The measurements of the treated-discharge water show that residual iodine is below ISE-detectable levels in the subject treatment systems A and B after periods of sustained use. These results establish that the water treatment design is both functional and robust.

FIG. 1 diagrammatically illustrates that water supply 10 (supply 10 is under pressure) is fed or applied to the system direct to particle filter 50. As explained later, when flow is sensed by flow sensor switch 12 near output control 54, the sensor detects flow through the system. The electronic output (nominally marked as "to s1, s2 and s3") of flow sensor switch 12 on the output line is applied as an activation signal to three cutoff valves represented as solenoid driven valves 14, 16, and 18 based upon electronic devices placed in electric control panel 20. Signal conditioning devices may alter s1, s2 and s3 such that the components are electrically compatible and those devices (not shown) are known to persons of ordinary skill in the art.

Once supply water under pressure flows through the system, flow is first applied to particle filter 22 which, in the preferred embodiment, is a 0.50 micron filter. The output of particle filter 22 is applied to a granule activated carbon (GAC) filter 24. The hydraulic output of GAC filter 24 is applied to a splitting junction 26 that splits the flow of partially treated water into a first flow on line 28 and second flow on line 30. Partially treated water flow on line 28 is fed to a cutoff valve which is labeled raw water solenoid number 1 or cutoff valve 14 in FIG. 1. The output of the cutoff valve 14 is applied to an iodine filter 32. In other embodiments, the iodine filter is replaced with halogen disinfectant material.

Orifice plate 34 and associated piping feeds the water to the lower regions of the iodine filter such that the water flows from the lower regions of the filter to an upper region. The output port for the disinfectant filter 32 is in an upper region of the filter. The orifice plate opening in the disinfectant filter 32 is either 0.010 inches, 0.013 inches, 0.015 inches, 0.020 inches, or 0.025 inches in diameter. Currently, a plastic disc with a single orifice is utilized as orifice plate 34. Orifice plate 34 controls the total flow of water through filter 32. This flow is severely restricted by orifice plate 32. The disinfectant crystals or solution in filter 32 are USP standards. The output of the disinfection filter or chamber 32 is applied to cutoff valve 16. Cutoff valve 16 is identified as disinfectant water solenoid in FIG. 1. The utilization of an input disinfectant cutoff valve 14 and an output disinfectant cutoff permits complete isolation of iodine filter 32 and the water in input line 31a and output line 31b. This is important because, during extended periods of non-use, the concentration of iodine in the isolated fluid channel (that fluid channel isolated by cutoff valves 14, 16, and confined by lines 31a, 31b. and the fluid in filter 32) extends the life of the iodine in the filter and limits the overall concentration of iodine in the entire system.

The fluid output from cutoff valve 16 is fed to summation junction 40 which combines fluid flow from lines 41a and 41b. Line 41a is the output of cutoff valve 16 and line 41b is the output from the cutoff valve 18. Cutoff valve 18 in FIG. 1 is identified as raw water solenoid 2.

Figure 4:
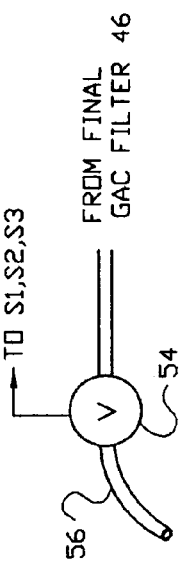
FIG. 4 diagrammatically illustrates that the dispensing valve can generate activation signals to the cutoff valves S1, S2, and S3.
Figure 3:
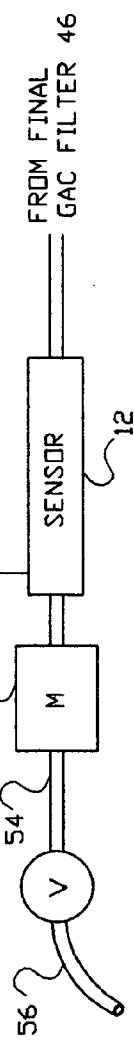
FIG. 3 diagrammatically illustrates the position of the flow sensor.

Cutoff valves 14, 16, and 18 are fluid valves which are actuated into a fully open or fully closed position based upon an electrical solenoid which is controlled by an activation signal applied to electrical line 13 from a flow sensor switch. In FIG. 1, flow sensor switch 12 is utilized. FIGS. 3 and 4 show other control mechanism to control the cutoff valves 14, 16, and 18.

Junction 40 combines the water from the disinfection (currently iodine) filter 32 with the diverted second flow of water which passes through raw water cutoff valve 18. Applicants estimate that the mix ratio between the disinfection treated water and water which is not treated by iodine disinfection filter 32 is about 50-1 raw water to disinfection treated water. The particulate orifice plate and the size of the orifice utilized in disinfection filter 32 are based upon the type of water to be treated by the water treatment system.

The combined water flow from junction 40 is applied to holding tank 42. The volumes of holding tank 42 is large enough given the flow of water from water supply 10 such the water remains in the tank for a period which results in a ct value that gives a minimum of 3 log pathogen reduction before being dispensed. Therefore, higher water flows from water supply 10 require larger holding tanks. Currently, minimum flow through the water treatment system is about 0.33 gallons per minute (GPM) and the maximum flow is about 0.75 GPM. Holding tank 42 is a 3 gallon tank. Water input into holding tank 42 is fed to the bottom regions of the holding tank by an appropriate conduit. Water extracted from holding tank 42 is taken from the top of the tank via line 44. The treated water from line 44 is fed to a final GAC filter 46. The output of GAC filter 46 is applied to meter 50 which contains a display 52. Meter 50 measures the total amount of low through the water treatment system and display 52 enables the user to determine when to replace the various GAC filters and the particle filter. The hydraulic output of meter 50 is applied to flow switch sensor 12 (which activates ON the cut-off valves 14, 16 and 18) and is further applied to a user control valve 54 and ultimately to a dispenser nozzle 56. The GAC filters and the particle filters are common items which are rated by manufactures based upon a total flow through the water treatment system. Of course, meter 50 could include various electronics to notify the user when to replace the particular GAC filters as compared to replacement of the iodine crystals in iodine filter 32.

Similar numerals designate similar items in all the drawings.

Figure 2:
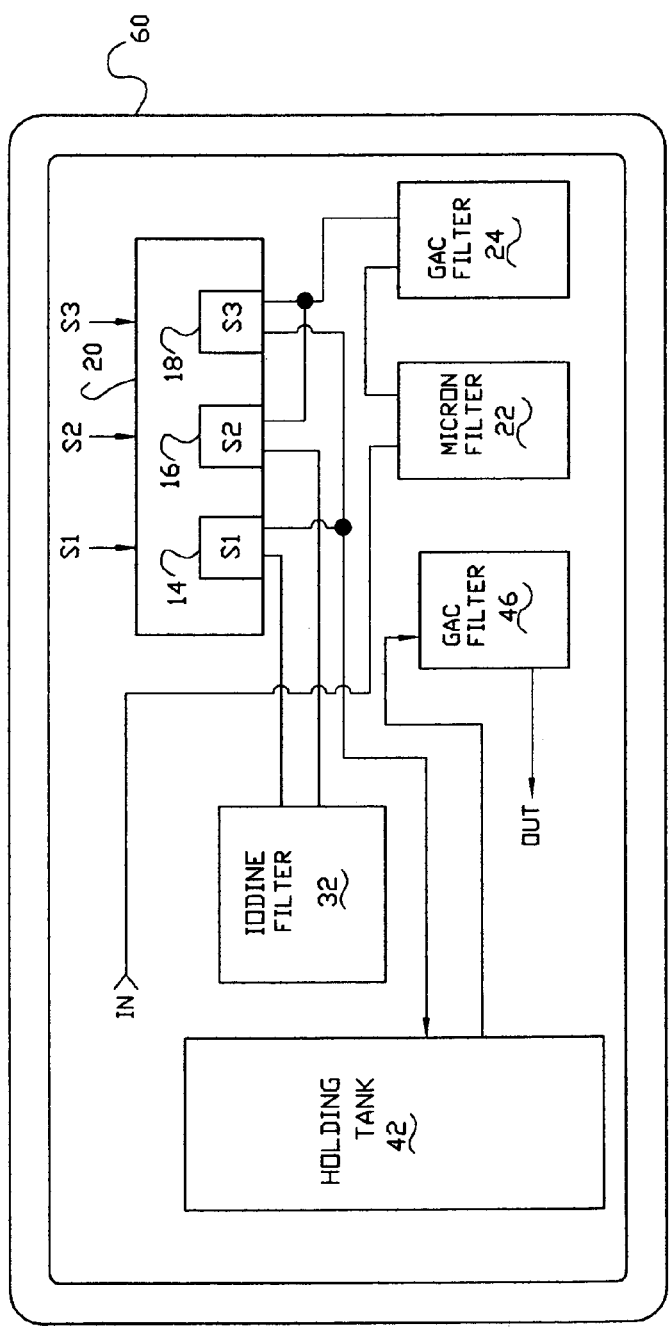
FIG. 2 diagrammatically illustrates the physical layout of a working embodiment of the treatment system.

FIG. 2 diagrammatically illustrates the physical positioning of the components in the iodine water treatment system in one working embodiment. The components are mounted in a stainless steel case 60 which is approximately 36 inches by 36 inches by 12 inches in size. Holding tank 42 is mounted on the floor of the case and filters, 32, 46, 22, and 24 are mounted on the back wall of the case. Electronic control panel 20 retains cutoff valves 14, 16, 18 which are driven by solenoids identified as S1, S2, and S3 in FIG. 2.

FIG. 3 diagrammatically illustrates that flow sensor 12 can be positioned before the meter 50 on the output of the system receiving treated water flow from final GAC filter 46. The output from flow sensor 12 is applied to the user actuated valve 34. Meter 50 can be disposed either upstream (FIG. 1) or downstream (FIG. 3) of sensor 12.

FIG. 4 diagrammatically illustrates that user control valve 54 can itself generate an activation signal to solenoids S1, S2 and S3 which control cutoff valves 14, 16 and 18, as described earlier.

What is claimed is:

1. An iodine water treatment system coupled to a water supply under pressure comprising:
   a flow sensor generating an activation signal when flow from said water supply is sensed;
   a particle filter and a carbon filter coupled in series with said water supply and creating a first partially treated water flow;
   a fluid splitter for said first partially treated water flow, said fluid splitter creating first and second diverted flows from said first partially treated water flow;
   an actuated first and second cutoff valve isolating an iodine filter coupled therebetween, said first cutoff valve receiving said first diverted flow from said fluid splitter and said iodine filter creating a second partially treated water flow;
   an actuated third cutoff valve receiving said second diverted flow from said fluid splitter;
   said first, second and third cutoff valves activated open in the presence of said activation signal from said flow sensor;
   a fluid junction coupled to said third cutoff valve and said second cutoff valve and mixing said second partially treated water flow with said second diverted flow to form a third partially treated water flow:
   a holding tank retaining a volume of said third partially treated water, said holding tank coupled to said fluid junction; and
   a final carbon filter coupled intermediate said holding tank and a dispenser unit, said final carbon filter removing iodine from said third partially treated water prior to the dispensing of water from said dispensing unit.

2. A water treatment system as claimed in claim 1 including a flow restrictor at said iodine filter which limits flow therethrough.

3. A water treatment system as claimed in claim 2 wherein said flow restrictor limits said first diverted flow to less than about one twentieth of said second diverted flow.

4. A water treatment system as claimed in claim 3 wherein said holding tank is large enough to retain said volume of said third partially treated water such that said third partially treated water remains in said tank for a time sufficient to obtain a minimum of 3 log reduction of pathogens.

5. A water treatment system as claimed in claim 4 wherein said dispenser unit controls flow through the entire water treatment system.

6. A water treatment system as claimed in claim 5 wherein said carbon filters are granular activated carbon filters.

7. A water treatment system as claimed in claim 6 wherein said particle filter is a 0.1-0.5 micron filter.

8. A water treatment system as claimed in claim 1 wherein said holding tank is large enough to retain said volume of said third partially treated water such that said third partially treated water remains in said tank for a time sufficient to obtain a minimum of 3 log reduction of pathogens.

9. A water treatment system as claimed in claim 1 wherein said dispenser unit controls flow through the entire water treatment system.

10. A water treatment system as claimed in claim 1 wherein said carbon filters are granular activated carbon filters.

11. A water treatment system as claimed in claim 1 wherein said particle filter is a 0.1-0.5 micron filter.

12. A method of treating water, supplied as input water under pressure, with iodine comprising:
providing an iodine filter;
initially treating an input water flow to remove particulate above a predetermined size and treating said input water flow with activated carbon;
splitting water flow after initially treating the same into a first and second flows, said first flow subject to a first controlled cutoff and said second flow applied to said iodine filter via a second controlled cutoff, said second flow after said iodine filter being subject to a third controlled cutoff, said second and third cutoffs providing fluid flow isolation of said iodine filter;
combining said first and second flows after said first controlled cutoff and said third controlled cutoff into a combined flow;
retaining said combined flow for a predetermined period of time;
filtering said combined flow with carbon; and
controlling said first, second and third cutoffs based upon said combined filtered flow after retention for said predetermined period of time.

13. A method of treating water as claimed in claim 12 including restricting said second flow through said iodine filter such that said second flow is substantially less than said first flow.

14. A method of treating water as claimed in claim 13 wherein said second flow is less than about one twentieth said first flow.

15. A method of treating water as claimed in claim 14 wherein said combined flow is retained for a time sufficient to obtain a minimum of 3 log reduction of pathogens prior to dispensing.

* * * * *